Figure 1:
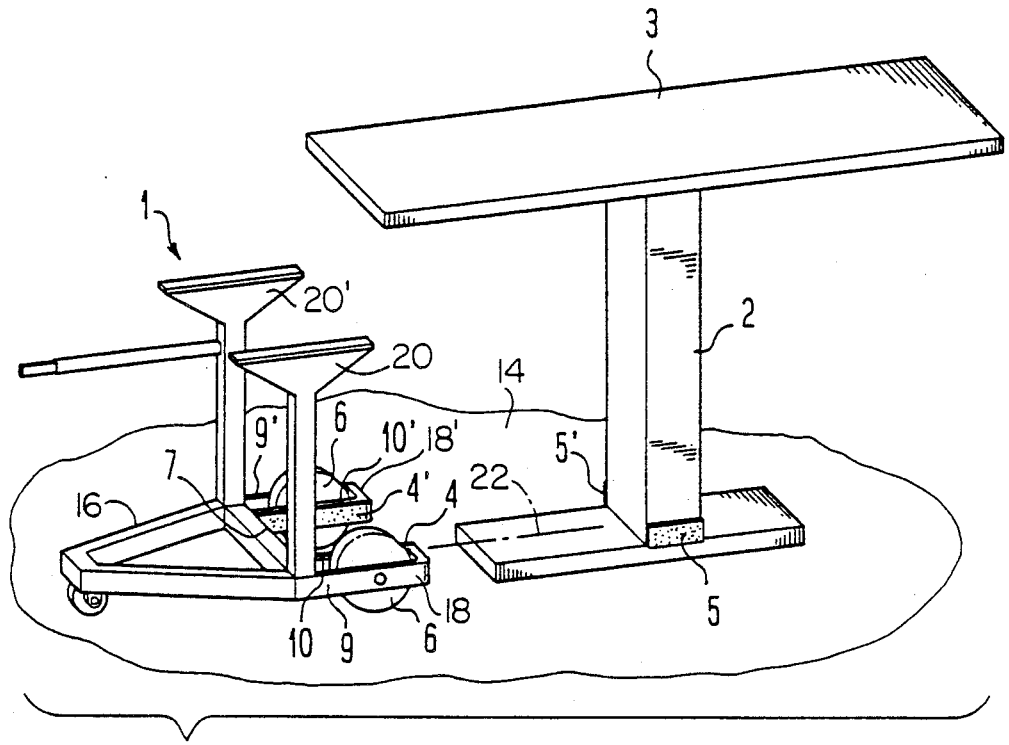

United States Patent

Schnelle et al.

[11] Patent Number: 5,123,797
[45] Date of Patent: Jun. 23, 1992

[54] TRANSPORT CARRIAGE FOR OPERATING TABLE PLATFORMS

[75] Inventors: Eberhard Schnelle, Rastatt; Matthias Dornauer, Karlsruhe, both of Fed. Rep. of Germany

[73] Assignee: Stierlen-Maquet AG, Rastatt, Fed. Rep. of Germany

[21] Appl. No.: 551,917

[22] Filed: Jul. 12, 1990

[30] Foreign Application Priority Data

Jul. 24, 1989 [DE] Fed. Rep. of Germany ....... 3924390

[51] Int. Cl.⁵ ............................................. B65G 69/00
[52] U.S. Cl. .................................. 414/401; 414/349; 414/402; 280/79.11; 280/62
[58] Field of Search ............... 414/397, 349, 399, 401, 414/402, 458; 5/81 B; 280/11.23, 79.11, 62

[56] References Cited

U.S. PATENT DOCUMENTS

| | | | |
|---|---|---|---|
| 2,788,220 | 4/1957 | Christensen | 280/79.11 X |
| 3,362,704 | 1/1968 | Pilz | 414/349 X |
| 3,389,922 | 6/1968 | Eastin | 280/11.23 X |
| 4,277,218 | 7/1981 | Schweichler | 414/401 |

Primary Examiner—Frank E. Werner
Assistant Examiner—James Keenan

[57] ABSTRACT

A transport carriage for the operating table platform of an operatng table with a liftable operating table platform, with at least two transport rolls of the transport carriage being supported on their axes for slidable movement in the axial direction.

1 Claim, 2 Drawing Sheets

TRANSPORT CARRIAGE FOR OPERATING TABLE PLATFORMS

The invention concerns a transport carriage for the platform of an operating table with a fixed column and a liftable platform.

Transport carriages of the type involved in this application are known from DE PS 1158663, from DE PS 1196815, from U.S. Pat. No. 3,362,704, and from U.S. Pat. No. 4,277,218.

In the case of an operating table system with an operating table column fixed to the floor and with a liftable operating table platform, a transport carriage is moveable under the operating table platform to the operating table column to effect transfer in a known manner.

For an error-free transfer of the operating table platform to the transport carriage an exactly registered positioning of the receiving and holding elements of the transport carriage and of the operating table platform is required.

Therefore, the transport carriage has guide elements, which embrace guide surfaces on the rigidly anchored operating table column, and stop elements.

The guide elements position the transport carriage in the transverse axis of the operating table and the stop elements position it in the longitudinal axis of the operating table. So that gentle and disturbance-free positioning can be achieved, the transport carriage must be moved toward the operating table column very exactly with respect to its lateral position.

The invention has as its object improvement of the approach and positioning processes so that gentle and disturbance-free positioning can be obtained even when the transport carriage is moved with less lateral accuracy, that is with lateral displacement, toward the operating table column.

This object is achieved in that the transport carriage for the support surface of the operating table is equipped with guide elements and with stop elements for positioning the transport carriage with respect to the operating table column and in that simultaneously at least two transport rolls of the transport carriage are supported on their axes for slidable movement in the axial direction and are held by means of spring elements in a pre-determined middle position along the axial direction of the transport roll axes.

It is achieved by means of the invention that the transport carriage can be positioned exactly, gently and disturbance-free even if it is driven toward the operating table column with some lateral displacement. The guide elements guide the transport carriage to the operating table column into the transfer position. The transport rolls which are supported for sliding movement in the axial direction allow a lateral shifting of the transport carriage frame, without the transport rolls themselves having to be pushed sideways over the floor, which leads to scratching and is associated with a high expenditure of force.

In the following the invention is explained in more detail in connection with only one embodiment illustrated by the drawings. The drawings are:

FIG. 1—a perspective representation of an operating table with an operating table platform and a transport carriage in a stand-by position.

Figure 2:
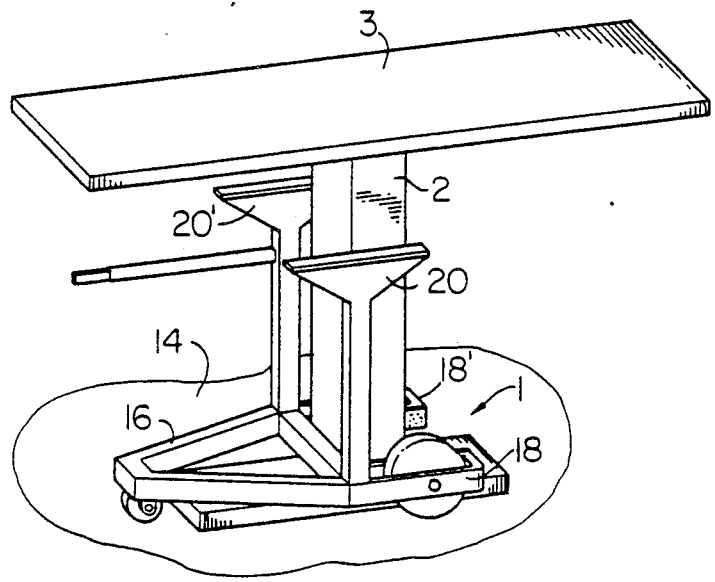

FIG. 2—a perspective illustration of an operating table with a positioned transport carriage.

Figure 3:
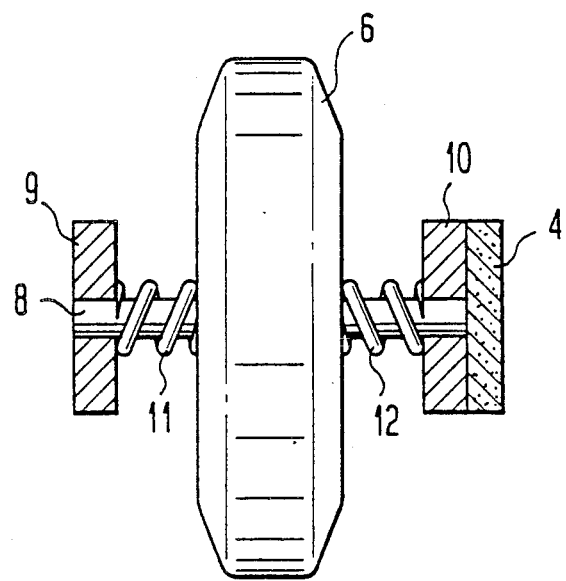

FIG. 3—a transport roll with an axle carrier and guide element shown in section.

A transport carriage 1 for an operating table platform 3, transferrable between the carriage 1 and a column 2 fixed to a floor 14, has a U-shaped frame open toward its front (with respect to the direction in which the carriage is driven for positioning toward the operating table column). The frame has a base portion 16 with two forward fork parts 18,18' each with two axle carriers 9, 10 and 9', 10'. The frame also includes two support structures 20,20' located on opposite sides of the base portion 16 and extending upwardly from its base portion for receiving and supporting the operating table platform. Fastened between the axle carriers 9, 10 and 9', 10' are axles 8 and 8' for the two forward transport rolls 6, 6'. The transport rolls 6, 6' are axially slidably supported on the axles 8, 8'. Spring elements 11, 12 and 11', 12' hold each transport roll 6, 6' in a neutral middle position. Each inner axle carrying part 10, 10' can be formed as a guide element, but it can also be advantageous, as shown in the illustrated embodiment, that supplemental guide elements 4,4' are fastened to the axle carrying parts 10, 10'. Whereas the axle carrying parts are made of metal and are designed for the necessary load to be carried, the supplemental guide elements can be made from a non-metal or metal with good sliding properties.

The transport carriage 1 is driven toward the operating table column 2 along a given horizontal path 22 fixed relative to the column 2 into the transfer position for the operating table platform. In doing this the fork parts 18,18' of the forwardly open U-shaped base portion of the frame of the transport carriage 1 embrace the operating table column 2 and inwardly facing carriage guide surfaces provided by the guide elements 4, 4' or by the axle carrying parts 10, 10' slide on the column guide surfaces 5, 5' of the operating table column 2 and thereby softly and gently position the transport carriage 1 into the transfer position. In case of the transport carriage 1 being driven toward the operating table column 2 with lateral displacement, the spring elements 11, 12 permit a lateral shifting of the transport carriage 1 relative to the transport rolls 6, 6' rolling on the floor, and thereby permit a disturbance-free adjustment of the transport carriage 1 to the exact transfer position. A stop element 7 on the transport carriage 1 can assure the transfer position in the drive direction.

The spring elements 11, 12 can for example be metal compression springs.

It is also contemplated that elastically deformable non-metallic hollow parts which somewhat cylindrically surround the axle 8 can be used as the spring elements. These non-metallic spring elements can be connected with the transport rolls 6 by means of interconnecting shapes or by means of a force connection, for example using adhesive.

We claim:

1. A transport carriage for receiving and transporting a platform of an operating table having a column fixed to a floor and a platform transferrable between the column and the transport carriage when the carriage is in a given transfer position relative to the column, with the column having two column guide surfaces located on opposite sides thereof which guide surfaces face outwardly of said column and extend parallel to a given horizontal path fixed relative to said column, said transport carriage comprising:

a frame having a base portion with two horizontally forwardly projecting fork parts spaced laterally from one another to provide said base portion with an open forward end and with a recess between said fork parts and extending rearwardly from said open forward end for receiving said column when said carriage is in said transfer position, said frame also having two support structures located on opposite sides of said base portion and extending upwardly from said base portion for receiving and supporting said platform of said operating table, a plurality of rolls connected with said frame for supporting said frame for rolling travel over said floor and whereby said carriage is moveable to said transfer position by travelling forwardly toward said column generally along said horizontal path with said fork parts embracing said column, said fork parts of said frame having parallel inwardly facing guide surfaces extending in a forward-to-rear direction relative to said frame which carriage guide surfaces are engagable with said column guide surfaces to exactly laterally position said carriage frame relative to said column as said carriage is moved toward said transfer position, said plurality of rolls including two forward rolls each carried by a respective one of said fork parts for rotation about an axis extending laterally of said frame, each of said forward rolls being supported on its associated fork part by a means biasing it to a given neutral position laterally of said fork part and permitting it to move laterally of said fork part along its axis of rotation to either side of said neutral position, whereby in the event said carriage is moved toward said column along a path of travel departing slightly laterally from said given horizontal path said carriage frame may shift laterally relative to said forward rolls to bring it to said transfer position relative to said column without said forward rolls having to slide laterally on said floor, and each of said forward rolls having an axle supporting it for rotation about its said axis of rotation and two springs received on said axle and located on opposite sides of said forward roll, each of said springs working between said forward roll and said associated fork part so that said two springs in combination bias said forward roll to its neutral position and permit it to resiliently shift in either direction laterally from said neutral position along its axis of rotation to permit lateral shifting of the transport carriage relative to the transport rolls to thereby permit disturbance-free adjustment of the transport carriage relative to the operating table column.

* * * * *